3,138,501
METHOD OF PREPARING A CYCLOTRIMETH-YLENE TRINITRAMINE AND CYCLOTET-RAMETHYLENE TETRANITRAMINE PLASTIC BONDED EXPLOSIVES
Sam B. Wright, Kingsport, Tenn., assignor to Eastman Kodak Company, Rochester, N.Y., a corporation of New Jersey
Filed June 18, 1962, Ser. No. 203,079
8 Claims. (Cl. 149—92)

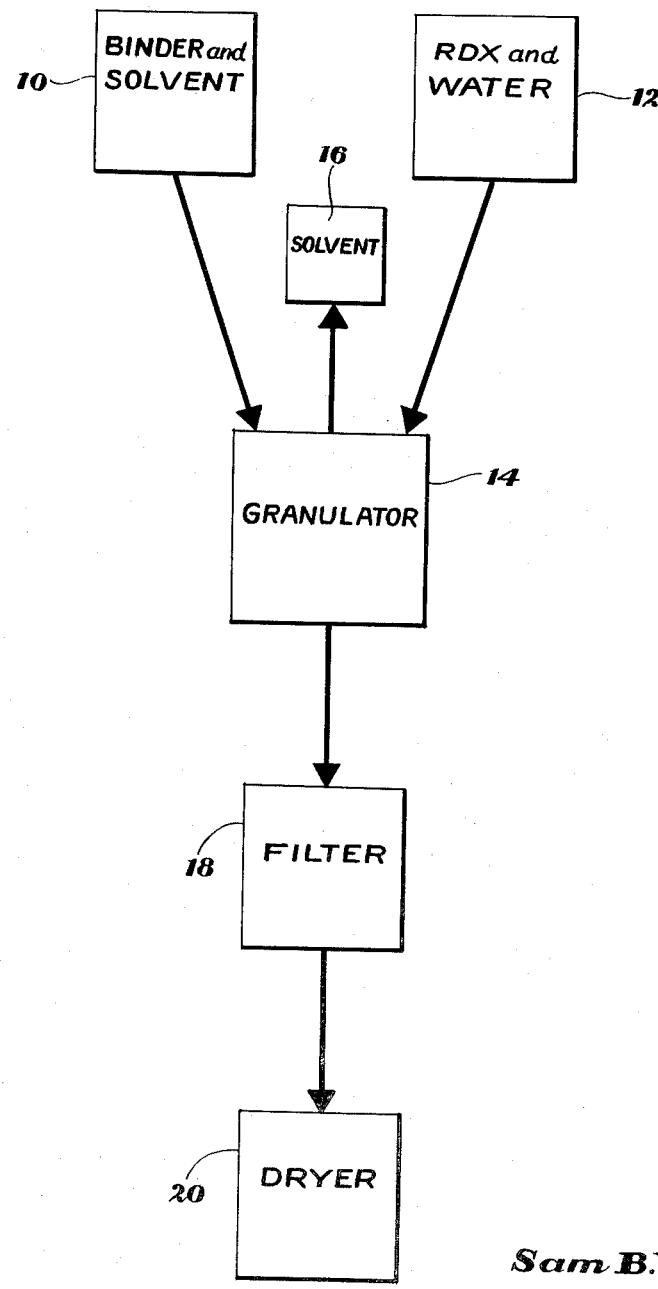

This invention relates to the manufacture of an explosive composition. More particularly, it relates to a method of granulating an RDX plastic-bonded explosive composition. The term RDX as used herein and as known to the art refers to cyclotrimethylene-trinitramine.

Plastic-bonded RDX has heretofore been produced by a process including the following three steps: (1) The binder, for example a plasticized resinous polymer composition such as a mixture of polyisobutylene, di(2-ethylhexyl) sebacate and SAE 10 motor oil, is mixed as follows: The polymer (pre-cut to a desirable size) is fed into a multiscrew compounder extruder and moves forward through a compounding and milling section. The plasticizing ingredient or ingredients are injected into the barrel of the extruder under high pressure where they are incorporated with the polymer. The partially digested binder is then caught from the extruder and transferred to a Baker-Perkins mixing kettle where the remainder of the plasticizing ingredient is added. The mixture is then mixed thoroughly to obtain a well plasticized binder. The final mixing step ordinarily requires about three hours at 82–90° C. The mixture is then placed in aluminum cans containing water to prevent sticking. The binder composition is next analyzed to insure proper makeup prior to additional processing. (2) The binder is incorporated in the RDX at room temperature as follows: A definite amount of RDX of a desired particle size is shoveled into an incorporation kettle, for example, a steel jacketed vessel with cylindrical sides and a hemispherical bottom. The vessel is equipped with agitator paddles. The agitator is then turned on and the plastic binder is added in small lumps. After mixing a few minutes, a portion of RDX of a particle size which may be different from that of the first RDX is added and the mixture further agitated until a homogeneous dough-like material is obtained. The mixture is then inspected to check for any unincorporated lumps. The material is dried by heating and mixing in the incorporation kettle.

This procedure, although generally satisfactory, oftentimes involves an undue amount of time and a considerable amount of rather complex machinery. Uniformity of the product, which is important due to its use as an explosive, is somewhat difficult to obtain by this procedure. It is therefore apparent that a new, improved and simplified procedure for the preparation of a substantially homogeneous plastic-bonded RDX represents a highly desirable result. After extended investigation, I have found such a process for preparing plastic-bonded RDX compositions.

One object of this invention is to provide a rapid, simple and economical process for obtaining granular plastic-bonded RDX. Another object is to provide a method of improving the uniformity of plastic-bonded RDX. Still another object is to provide a process whereby the preparation and addition of the binder composition used in plastic-bonded RDX is simplified. A further object of this invention is to provide a method of producing plastic-bonded RDX whereby the incorporation, drying and materials handling times are decreased. A still further object is to provide a process of kneading granular RDX into a dough-like consistency to obtain improved plasticity. Other objects will appear hereinafter.

In its broader aspects my invention involves the addition of binder components to a water slurry of RDX after dissolving in a water-immiscible solvent, granulation being accomplished by agitation of the resulting mixture with distillation of the solvent from the system. Preferred water-immiscible solvents are toluene and xylene, although other similar organic water-immiscible solvents may be used. The binder composition is prepared by dissolving a resinous polymer, for example, polyisobutylene, in the water-immiscible solvent. This is best accomplished by agitation of from 1 to 2 hours. The preferred amount of polymer is 0.023 part by weight dissolved in 0.26 to 0.40 part by weight (for what appears to be optimal results, about 0.34 part by weight) of the water-immiscible solvent. The polymer may be cut or shredded into small pieces. The plasticizing ingredient or ingredients are preferably added with mixing after the addition of the polymer. When di(2-ethylhexyl) sebacate is used as a first plasticizing ingredient, the preferred amount is 0.053 part by weight; and when SAE 10 motor oil is used as a second plasticiing ingredient, the preferred amount is 0.014 part by weight. A substantially homogeneous solution is obtained by thorough mixing.

The RDX slurry to which the binder composition is added is prepared by mixing a small amount of RDX, which may be of more than one particle size, with 4 to 15 parts by weight of water, preferably about 10 parts. When the RDX is of two particle sizes, the preferred amount of coarser RDX is 0.61 part by weight and the preferred amount of finer RDX 0.30 part by weight. A small amount of dispersing agent may be added to facilitate thorough mixing of the water/RDX slurry, for example, about 0.0002 to 0.0004 part by weight of gelatin or other suitable dispersing agent such as gum arabic, dextrin, poly(vinyl alcohol) or the like. The slurry is heated to 75 to 80° C. and the binder solution at a temperature of 60–70° C. added during a 1- to 2-minute period. The binder or lacquer is preferably added at a rate such that it is distributed rapidly throughout the water/RDX slurry. The slurry is agitated, for example, at 350 to 600 r.p.m., and the solvent removed for example, in a preferred manner, by distillation at atmospheric pressure. A slurry temperature of about 100° C. is used to insure complete removal of the solvent from the system. The solvent to water ratio, agitation speed and amount of protective colloid are adjusted so as to obtain the granulation desired. Upon the addition of the binder to the RDX/water slurry it is mixed with the RDX and then subdivided into individual granules. Shear action by an agitator may be used in this step. The granules are hardened by the removal of the solvent from the system.

The granular material is vacuum filtered to a moisture content of about 7 to 10 percent. This material is then dried in an incorporation kettle by heating to about 90° C. During this drying process the material is kneaded with agitation into a dough-like consistency. Other means of drying the resulting granular Composition C-4 include a rotary vacuum dryer, forced air tray dryer, fluidized bed dryer or the like. The resulting dried granules may be kneaded into the characteristic dough-like consistency by hand, roller, or other means of mixing yielding a shearing force.

The plastic-bonded RDX composition prepared in accordance with the procedure of my invention desirably contains 91±1% RDX and 9±1% binder, has a plasticity of 0.030 unit, maximum, and a specific gravity of 1.50 g./ml. One form of plastic-bonded RDX composition is known as "Composition C-4" and contains the following specific composition which may be prepared by my procedure.

(1) 61% coarse or Class A RDX (about 50% retained on U.S.S. No. 1 sieve)
(2) 30% fine or Class E RDX (about 3% retained on U.S.S. No. 325 sieve)
(3) 2.25% polyisobutylene
(4) 5.31% di(2-ethylhexyl) sebacate
(5) 1.44% SAE 10 motor oil For a more complete understanding of my invention reference is made to the attached drawing which is a part of the present application and illustrative of the process of my invention. The drawing is in schematic flow sheet form.

In the drawing, the composition of this invention is prepared from two separate portions, binder 10 and uncoated RDX 12. The binder is mixed by agitation with a water-insoluble organic solvent at 10 and the RDX is agitated and thoroughly mixed with water at 12. The binder solution 10 is added to the RDX/water mixture 12 with thorough mixing to form a slurry 14. In the next step the solvent is distilled off at 16 leaving resulting granules. This is followed by a filtration at 18 which may be by vacuum. The composition is then dried at 20 to a dough-like consistency.

The following examples are illustrative of my invention but are not intended to be limiting.

Example I

*Lacquer preparation.*—Add 12.5 grams polyisobutylene, pre-cut to marble size, to 130 g. toluene. Agitate the mixture at 60–70° C. for 1½ hours. Add 8.0 g. motor oil (SAE 10) and 29.5 g. di(2-ethylhexyl) sebacate and mix well. Cool to 30° C.

*Granulation.*—Add 5 l. of water to a 10-l. granulator, adjust agitation and add 150 g. of Class E RDX and 300 g. of Class A RDX. Add 0.1 g. gelatin and heat the slurry to 65° C. Add the lacquer over a 1- to 2-minute period with agitation set at 450 to 500 r.p.m. Heat the mixture to 99.5 to 100° C. Cool the slurry to 60° C. Transfer the slurry to a vacuum filter and remove the water. Dry the product at 50–60° C., using a forced air dryer, for 2½ hours.

Results: Percent added
RDX, percent=89.90 _____ 90.0
Binder, percent=10.09 _____ 10.0
Water, percent=0.01 _____ ---
Binder content—
 2.68% polyisobutylene.
 7.41% oil+di(2-ethylhexyl) sebacate.
Plasticity—0.004 unit.

Example II

*Lacquer preparation.*—The lacquer was prepared as described in Example I with the exception that 170 g. toluene were used.

*Granulation.*—Add 505 g. RDX (2 parts Class A RDX and 1 part Class E RDX) to 5.5 l. of water in a 10-l. granulator. Add 0.2 g. gelatin and heat the mixture to 75° C. The lacquer addition and solvent removal are made according to the procedure outlined under Example I.

The product was dried at room temperature, 25 to 30° C. by placing the material in open trays. The depth of the material was about ½ inch.

Results: Percent added
RDX, percent—90.60 _____ 91.0
Binder, percent—9.23 _____ 9.0
Water, percent—0.17 _____ ---
Binder content—
 2.33% polyisobutylene _____ 2.25
 6.90% oil+di(2-ethylhexyl) sebacate ___ 6.75

Example III

The product was prepared as described in Example No. I with the exception that the amount of toluene was increased to 200 grams and the amount of water for the RDX/water slurry was reduced from 5 liters to 2 liters.

Results: Percent added
RDX, percent—90.40 _____ 90.9
Binder, percent—9.47 _____ 9.1
Water, percent—0.13 _____ ---

Example IV

*Binder preparation.*—Add 4.55 liters toluene to a 10-l. still. Heat to 70° C. Add 254.3 g. polyisobutylene, cut in small pieces to facilitate dissolution, and reflux the solvent until solution of the binder is obtained. Cool the solution to 30° C., add 603.8 g. di(2-ethylhexyl) sebacate and 174.8 g. motor oil (SAE 10). Mix well, and transfer the binder to a safety can. Prepare two binder batches as described above for 50-lb. batch of Composition C-4.

*Granulation.*—Add 400 lb. water and 30.5 lb. Class A RDX and 15.0 lb. Class E RDX to the granulator. Add 0.01 lb. dry gelatin and heat the slurry to 75 to 80° C. Add the prepared lacquer at a rate of about ½ gal. per minute. Set agitation at 250 r.p.m. and heat the slurry to 99 to 100° C. Cool the batch to 50 to 60° C., and drop the material to a vacuum filter. Dry a portion of the product by the following methods: rotary vacuum dryer at 60° C., forced air dryer at 60 to 70° C., and an incorporation kettle at 90° C.

Results: Percent added
RDX, percent—90.90 _____ 91.0
Binder, percent—8.97 _____ 9.0
Water, percent—0.18 _____ ---
Plasticity—0.004 units.
Specific gravity—1.65 g./ml.

Example V

*Binder preparation.*—Prepare the binder, in a production-scale lacquer pot according to the method described in Example IV. Use the following amounts of materials.

Lbs.
Polyisobutylene _____ 56
Di(2-ethylhexyl) sebacate _____ 133
Motor oil (SAE 10) _____ 39
Toluene _____ 850

*Granulation.*—The material was granulated according to the procedure outlined in Example IV. A production-scale granulator was used. The material used included RDX, Class A, 1525 lb.; RDX, Class E, 750 lb.; water, 20,000 lb.; gelatin, 0.5 lb.

Results: Percent added
RDX, percent—91.03 _____ 90.9
Binder, percent—8.97 _____ 9.1
Water, percent—0.06 _____ ---
Insolubles, percent—none _____ ---
Plasticity—0.010 unit.
Specific gravity, g./ml.—1.60.

Example VI

*Binder preparation.*—Dissolve 0.023 part polyisobutylene (120,000 molecular weight) in 0.340 part toluene at 70–75° C. by mechanically agitating for 1 to 2 hours. The polyisobutylene is cut into small pieces to reduce the time of dissolution. Add 0.053 part di(2-ethylhexyl sebacate) and 0.014 part motor oil (No. 10) and mix well. Dissolution of the polyisobutylene may be promoted by allowing the plastic to soak 16 to 20 hours in the toluene.

*Granulation*

(a) Slurry 0.61 part Class A RDX, and 0.30 part Class E RDX with 4 to 10 parts water in a suitable size still equipped with an agitator.

(b) Add 0.0002 to 0.0004 part gelatin and heat to 75 to 80° C.
(c) Add the lacquer at 60 to 70° C. over a one to two minute period. Set agitation at 350 to 600 r.p.m.
(d) Distill the solvent from the system. Heat to a slurry temperature of 99 to 100° C.
(e) Cool the batch and filter.

The material is dried and kneaded into a dough-like consistency.

Advantages of processing plastic-bonded RDX in granular form include ease of lacquer preparation, size of process batch, reduced drying time, better distribution of the binder, and less material handling.

From the foregoing description and examples it will be apparent that I have provided an improved method of preparing RDX plastic-bonded explosive compositions whereby the formation of lumps is substantially eliminated and substantially homogeneous compositions capable of improved detonation are obtained.

Although the invention has been described in considerable detail with particular reference to certain preferred embodiments thereof, variations and modifications can be effected within the spirit and scope of the invention as described hereinabove, and as defined in the appended claims.

I claim:
1. A method for the preparation of a cyclotrimethylene trinitramine and cyclotetramethylene tetranitramine plastic-bonded explosive composition which comprises preparing a non-explosive unsubstituted polyhydrocarbon resin binder in an insensitive organic hydrocarbon water-immiscible solvent for said binder with thorough mixing, preparing a mixture of said explosive in water, adding the solution of binder in said water-immiscible solvent to the mixture of said explosive in water with agitation, thereby forming a substantially homogeneous slurry, distilling off said water-immiscible solvent to form granules from said slurry, filtering said slurry, and drying the product formed thereby to a dough-like consistency.
2. The method according to claim 1 wherein the binder solution contains a plasticizing ingredient for the non-explosive unsubstituted polyhydrocarbon resin binder.
3. The method according to claim 1 wherein the binder in the water-immiscible solvent comprises plasticized polyisobutylene and motor oil and the mixture of explosive in water comprises cyclotrimethylene trinitramine, water and a gelatinous substance selected from the group consisting of gelatin, gum arabic, dextrin, and polyvinyl alcohol.
4. The method according to claim 1 wherein the solution of binder in water-immiscible solvent comprises polyisobutylene, di(2-ethylhexyl) sebacate, SAE 10 motor oil and a solvent selected from the group consisting of toluene and xylene and the mixture of explosive in water comprises a mixture of more than one particle size of cyclotrimethylene trinitramine, gelatin and water.
5. The method according to claim 1 wherein the mixture of explosive in water contains coarse crystals of cyclotrimethylene trinitramine, fine crystals of cyclotrimethylene trinitramine, water and gelatin.
6. The method according to claim 1 wherein the product is dried to a dough-like consistency by kneading and drying at a temperature of from about 60° C. to about 90° C.
7. A method for the production of plastic-bonded cyclotrimethylene trinitramine which comprises:
(1) adding about 0.023 part by weight polyisobutylene shredded into small pieces to about 0.34 part by weight toluene with agitation;
(2) adding to the resulting mixture about 0.053 part by weight of di(2-ethylhexyl) sebacate followed by about 0.014 part by weight of SAE 10 motor oil;
(3) thoroughly mixing said mixture until a substantially homogeneous solution is obtained;
(4) mixing about 0.61 part by weight cyclotrimethylene trinitramine of a particle size such that 50° is retained by a U.S.S. No. 100 sieve and about 0.30 part by weight cyclotrimethylene trinitramine of a particle size such that 3% is retained by a U.S.S. No. 325 sieve with about 10 parts by weight of water;
(5) adding from about 0.002 part to about 0.004 part by weight dispersing agent to facilitate thorough mixing of the resulting slurry of cyclotrimethylene trinitramine in water;
(6) heating the slurry of cyclotrimethylene trinitramine in water to a temperature of from about 75° to about 80° C.;
(7) adding the solution of polyisobutylene and toluene at a temperature of from about 60° to about 70° C. to the heated slurry of cyclotrimethylene trinitramine in water over a period of about one to two minutes, thereby distributing said solution rapidly throughout said slurry;
(8) agitating the slurry of cyclotrimethylene trinitramine in water containing the added solution of polyisobutylene in toluene while continuing the agitating at atmospheric pressure and at a slurry temperature of about 100° C., thereby distilling off substantially all of the solvent and forming granules by the distillation and the shear action of the agitating;
(9) vacuum filtering the resulting granular cyclotrimethylene trinitramine to a moisture content of from about 7 to about 10% by weight and
(10) drying the granular cyclotrimethylene trinitramine in a dryer at a temperature of about 90° C. while kneading same to a dough-like consistency.
8. In a method for the production of plastic-bonded cyclotrimethylene trinitramine by mixing a binder with cyclotrimethylene trinitramine, the improvement which comprises adding a solution of polyisobutylene in a solvent selected from the group consisting of toluene and xylene to a slurry of cyclotrimethylene trinitramine in water, thoroughly mixing the resulting dispersion of the solution of polyisobutylene in the slurry of cyclotrimethylene trinitramine, evaporating the solvent from the system and kneading to a dough-like consistency, thereby forming granules of plastic-bonded cyclotrimethylene trinitramine.

References Cited in the file of this patent
UNITED STATES PATENTS

| | | |
|---|---|---|
| 2,471,851 | Wright et al. | May 31, 1949 |
| 2,999,743 | Breza et al. | Sept. 12, 1961 |

OTHER REFERENCES
Military Explosives, TM9–1910/TO11A–1–34, Departments of the Army and the Air Force, April 1955, p. 204.